United States Patent
Hielkema et al.

(10) Patent No.: US 10,584,796 B2
(45) Date of Patent: Mar. 10, 2020

(54) SEAL, ASSEMBLY, AND RETENTION METHOD

(71) Applicant: GE Aviation Systems, LLC, Grand Rapids, MI (US)

(72) Inventors: Jerry Hielkema, Loves Park, IL (US); Matthew Lindsay, Loves Park, IL (US); Scott Johnson, Loves Park, IL (US); Roy Ott, Loves Park, IL (US); Joseph Popham, Loves Park, IL (US)

(73) Assignee: GE AViation systems, ILC, Grand Rapids, MI (US)

( * ) Notice: Subject to any disclaimer, the term of this patent is extended or adjusted under 35 U.S.C. 154(b) by 110 days.

(21) Appl. No.: 15/226,779

(22) Filed: Aug. 2, 2016

(65) Prior Publication Data

US 2018/0038489 A1    Feb. 8, 2018

(51) Int. Cl.
| | |
|---|---|
| *F16K 1/20* | (2006.01) |
| *F16K 1/226* | (2006.01) |
| *F16K 1/46* | (2006.01) |
| *F16J 15/02* | (2006.01) |

(52) U.S. Cl.
CPC ............. *F16K 1/205* (2013.01); *F16J 15/022* (2013.01); *F16K 1/2261* (2013.01); *F16K 1/46* (2013.01)

(58) Field of Classification Search
CPC .......... F16K 1/205; F16K 1/46; F16K 1/2261; F16J 15/022
USPC ..... 251/306–307, 316, 317.01; 277/637, 644
See application file for complete search history.

(56) References Cited

U.S. PATENT DOCUMENTS

| | | | | |
|---|---|---|---|---|
| 2,600,310 | A | * | 6/1952 | Marien .................... F16J 9/063 277/472 |
| 2,911,183 | A | * | 11/1959 | Matthews ........... F16K 31/0655 251/129.02 |
| 3,338,584 | A | * | 8/1967 | Tokio Nakanishi ........................ F16C 33/7806 277/565 |
| 3,556,475 | A | | 1/1971 | Olenik |
| 3,734,457 | A | * | 5/1973 | Roos ..................... F16K 1/2285 251/173 |
| 4,005,848 | A | * | 2/1977 | Eggleston ............ F16J 15/3216 251/173 |
| 4,194,749 | A | * | 3/1980 | Bonafous ............... F16J 15/322 251/306 |
| 4,322,058 | A | * | 3/1982 | Thompson ............ B24C 7/0046 251/145 |
| 4,505,290 | A | * | 3/1985 | Scobie .................. F16K 1/2266 137/74 |
| 4,593,916 | A | * | 6/1986 | Laulhe .................... F16K 1/226 251/306 |

(Continued)

FOREIGN PATENT DOCUMENTS

| | | |
|---|---|---|
| DE | 10 2005 048 417 A1 | 4/2007 |
| GB | 901750 A | 7/1962 |

OTHER PUBLICATIONS

International Search Report and Written Opinion issued in connection with corresponding PCT Application No. PCT/US2017/040847 dated Sep. 29, 2017.

*Primary Examiner* — John Bastianelli
(74) *Attorney, Agent, or Firm* — Wood IP LLC

(57) ABSTRACT

The present invention relates to a valve assembly that includes a retaining ring disposed within a cavity formed by adjoining a retainer and a disk member. The retaining ring can be disposed at a slant with respect to an inner surface of the cavity.

8 Claims, 7 Drawing Sheets

(56) References Cited

U.S. PATENT DOCUMENTS

| | | | | |
|---|---|---|---|---|
| 4,632,360 | A | * | 12/1986 | DeSalve ................. F16K 1/228 |
| | | | | 251/173 |
| 4,872,642 | A | * | 10/1989 | Oshima ................. F16K 1/2261 |
| | | | | 251/173 |
| 4,899,984 | A | * | 2/1990 | Strickler ............... F16K 1/2261 |
| | | | | 251/180 |
| 5,326,077 | A | | 7/1994 | Spencer et al. |
| 6,138,989 | A | * | 10/2000 | Lynch ..................... F16K 1/226 |
| | | | | 251/306 |
| 6,189,861 | B1 | * | 2/2001 | Gotch ....................... F16K 7/16 |
| | | | | 251/331 |
| 8,528,880 | B2 | * | 9/2013 | LaBenz ................. F16K 1/2261 |
| | | | | 251/306 |
| 8,727,312 | B2 | | 5/2014 | Lockwood et al. |
| 2012/0025118 | A1 | | 2/2012 | LaBenz et al. |
| 2012/0104300 | A1 | | 5/2012 | Dowd et al. |
| 2012/0319022 | A1 | * | 12/2012 | Helfer ................. F16K 1/2266 |
| | | | | 251/306 |

\* cited by examiner

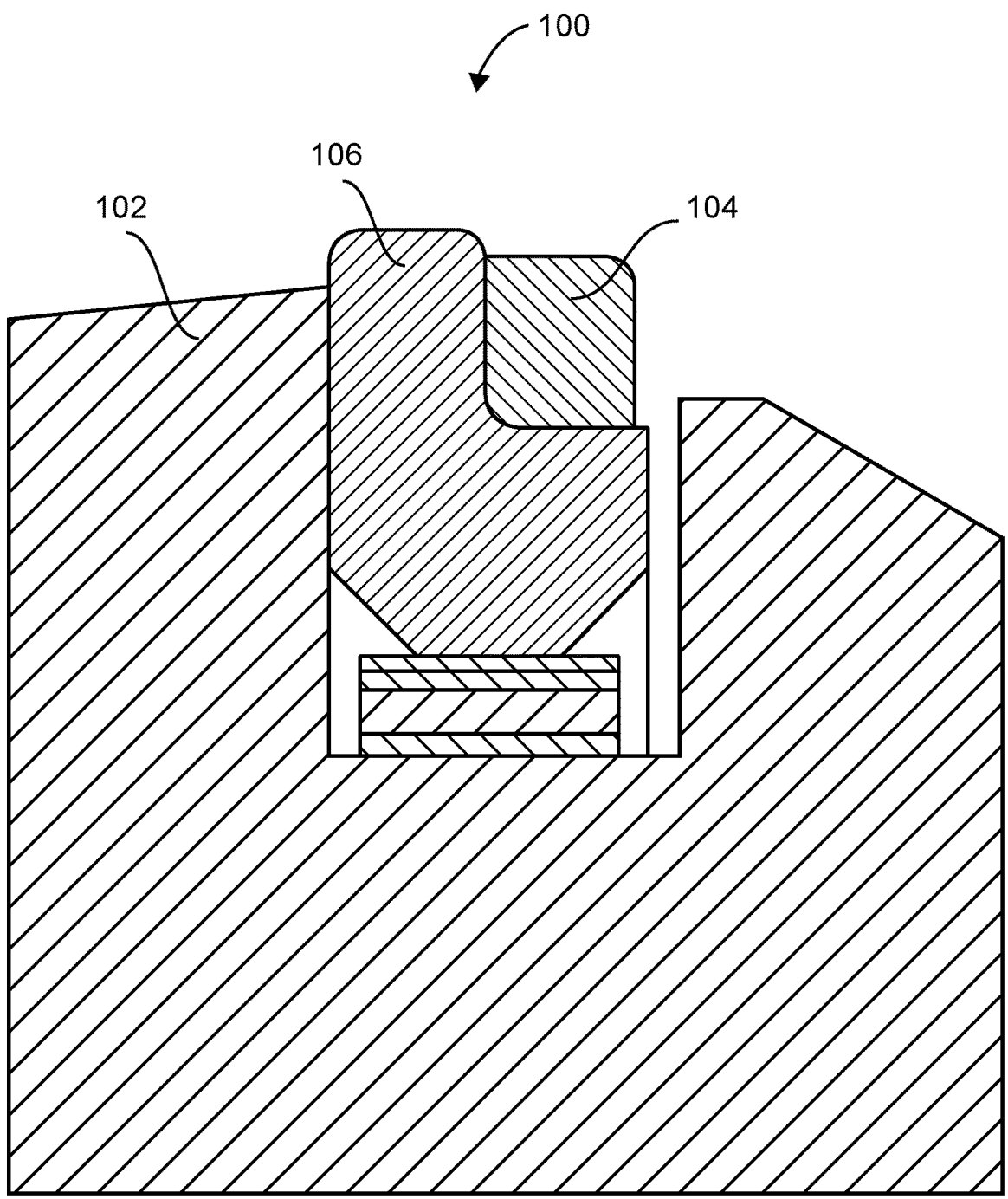
(CONVENTIONAL)
FIG. 1

SEAL, ASSEMBLY, AND RETENTION METHOD

I. TECHNICAL FIELD

The present invention relates generally to valve assemblies. In particular, the present invention relates to valve seal assembly designs used in aerospace applications.

II. BACKGROUND

Premature failure in valve seal assemblies used in engine valves, especially engines used in aerospace applications, can be particularly problematic. For example, conventional valve seal assemblies, commonly used in many jet engines, are subjected to significant forces and other stresses when air flow impinges on the seal. Butterfly seals, for example, are routinely used in these applications. Butterfly seals, however, include a carbon seal ring that deforms under the pressure of significant air flow forces occurring during operation. This deformation can cause the valve to fail.

More specifically, conventional valves can be more prone to failure because of the configuration of their constituent parts. For example, a conventional butterfly valve includes a disk member, a retainer, and a seal disposed between a surface of the retainer and a surface of the disk member. The seal, however, is not supported by a substrate, or not strongly supported on a base structure. Consequently, when subjected to a significant air flow, the absence of a strong substrate attachment causes the seal to move excessively.

Further, when the seal is constructed of carbon it can bend when exposed to these air flow forces. Bending can also cause the seal to deform or rupture, resulting in failure. When the seal fails, the retainer extends into the valve's bore, causing the conventional valve to jam in the open position. Accordingly, conventional valves can have a short lifespan, resulting in increased service frequency for jet engines that use them.

III. SUMMARY OF THE EMBODIMENTS

Given the aforementioned deficiencies, a need exists for improved seal retention configurations that minimize the effect of air flow forces and other stresses. Also needed is an improved substrate that adequately supports seals included in valve assemblies. Furthermore, there exists a need to extend the life of carbon seals to minimize part servicing and/or replacement, which in turn saves costs. The embodiments featured herein help solve the above-noted deficiencies.

For example, one embodiment provides a valve assembly that includes a retaining ring disposed within a cavity formed by adjoining a retainer to a disk member. The retaining ring can be disposed at a slant with respect to an inner surface of the cavity.

Another embodiment provides a valve assembly including a seal and a retainer. The valve assembly can also include a retaining ring providing a force securing the seal between the retainer and a disk member. The retaining ring is disposed at a slant in a cavity formed by adjoining the retainer to the disk member.

Additional features, advantages, and other aspects of various embodiments are described below with reference to the accompanying drawings. It is noted that the present disclosure is not limited to the specific embodiments described herein. These embodiments are presented for illustrative purposes. Additional embodiments, or modifications of the embodiments disclosed, will be readily apparent to persons skilled in the relevant art(s) based on the teachings provided.

IV. BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are for purposes of illustrating the embodiments and are not to be construed as limiting the disclosure. Given the following enabling description of the drawings, the novel aspects of the present disclosure should become evident to a person of ordinary skill in the relevant art(s).

FIG. 1 illustrates an example cross-sectional view of a conventional valve assembly.

V. DETAILED DESCRIPTION OF THE EMBODIMENTS

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

FIG. 1 is a cross-sectional view of a conventional valve assembly 100. The conventional valve assembly 100 includes a disk member 102, a retainer 104, and a seal 106 secured by retainer 104 onto a surface of disk member 102. In the conventional valve assembly 100, the seal 106 can move excessively into an air flow, or stream, because of the lack of a strong substrate attachment. This substrate deficiency is inherently present in the design, and limits the seal's lifespan as explained above.

More specifically, excessive bending forces exerted on seal 106 during operation can lead to premature failure, especially when seal 106 is made of carbon. These forces also cause the retainer 104 to fail by causing the retainer 104 to extend into the valve's bore (not shown). This extending causes the conventional valve assembly 100 to jam in the open position. The exemplary embodiments described herein resolve these issues.

Figure 2:
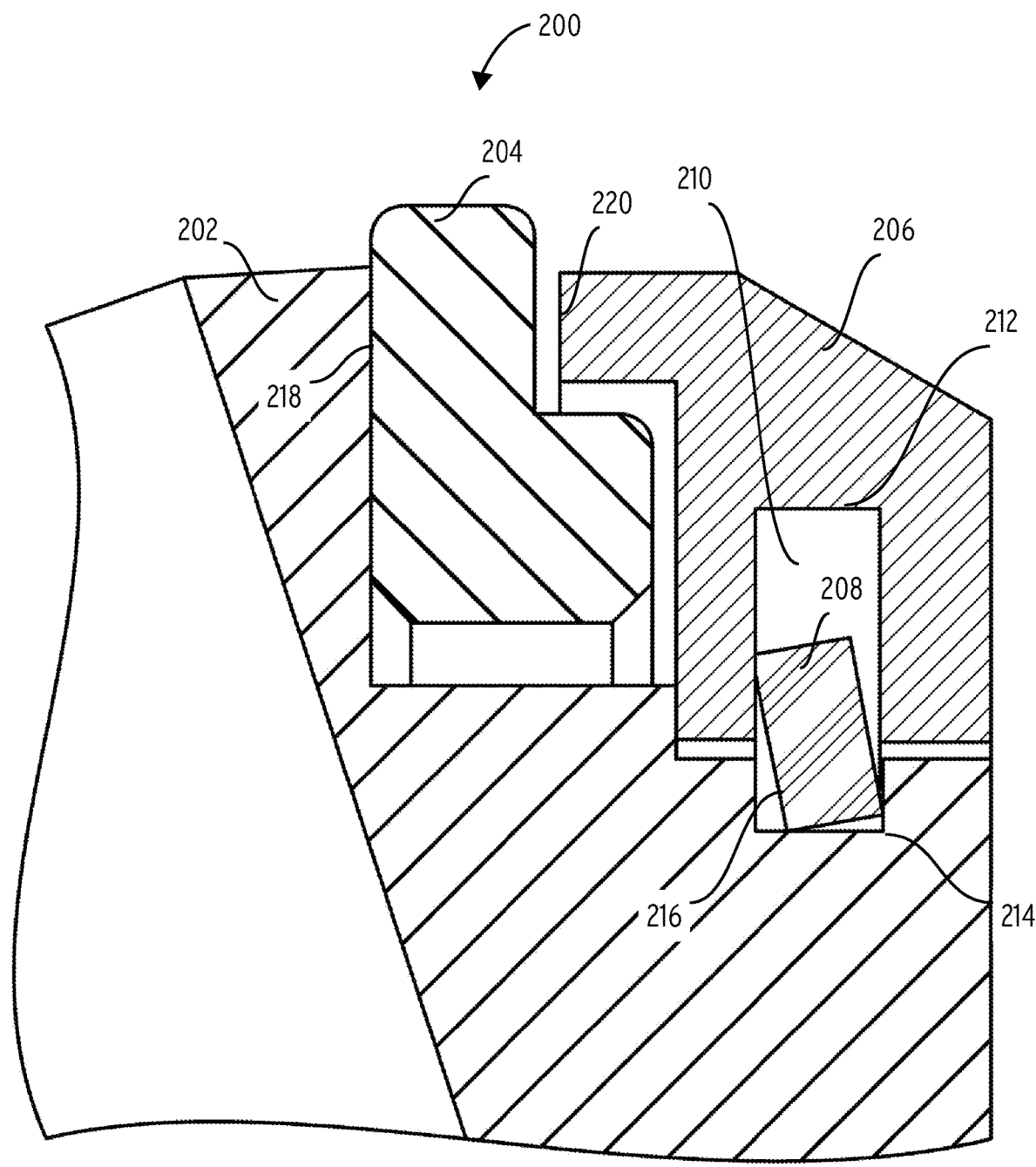
FIG. 2 illustrates an example cross-sectional view in accordance with various aspects described herein.

FIG. 2 illustrates a cross-sectional view of a valve assembly 200 in accordance with various aspects described herein. The valve assembly 200 can be a butterfly seal assembly, and can include a disk member 202 and a retainer 206 with a seal 204 secured therebetween. At least one of the disk member 202 and the retainer 206 can be made of either steel, stainless steel, or generally speaking, of a corrosion-resistant material (e.g. corrosion-resistant steel).

The seal 204 can be secured partly between a first surface 218 of the disk member 202 and a second surface 220 of the retainer 206. A part of the seal 204 can protrude outwardly, away from the disk member 202 and the retainer 206. The part of seal 204 protruding outwardly performs the sealing operation of the valve when the valve assembly 200 is actuated. The seal 204 can be an L-shaped seal. That is, its cross-section can have a form shaped substantially like an L. The seal 204 can also have other cross-section shapes, known to one of skill in the relevant art(s). For example, a T-shaped seal could also be used.

A cavity 210 is formed by adjoining the disk member 202 and the retainer 206. Specifically, the retainer 206 includes a first groove 212 and the disk member 202 includes a second groove 214, which, when the two parts are joined, form the cavity 210.

A retaining ring 208 is disposed at a slant 216 with respect to a bottom surface of cavity 210. Generally speaking, the retaining ring 208 is angled (i.e., slanted) with respect to an inner surface of cavity 210. The retaining ring 208 can have a rectangular cross-section. Furthermore, the retaining ring 208 can be made of an age-hardened iron super alloy, or generally speaking, from an iron-based alloy.

When disposed (i.e., with the slanted orientation with respect to the bottom surface of the cavity 210), the retaining ring 208 provides a lateral force. That is, the retaining ring 208 provides a force from right to left in FIG. 2, which keeps the seal 204 secured in place. This configuration provides stronger seal retention in comparison with the seal retention in the conventional valve assembly 100.

The retaining ring 208 provides an additional retaining force that helps keep the seal 204 in place during typical operation where an air stream is incident on the valve assembly 200. The retaining force is, in addition to the forces being generated by the retainer 206, pressing or biasing the seal 204 on the disk member 202. As such, the seal 204 is securely held in place and does not excessively protrude into the air stream. Thus, the stresses exerted on the seal 204 by the air stream are prevented (or reduced to a minimum) because the retaining ring 208 provides the additional retaining for securing the seal 204 during operation. In this manner, the embodiments provide highly durable seals. For valve assemblies that utilize carbon seals, increased durability can be obtained as carbon seals are more susceptible to failure, than other types of seals, from being overly stressed.

Figure 3:
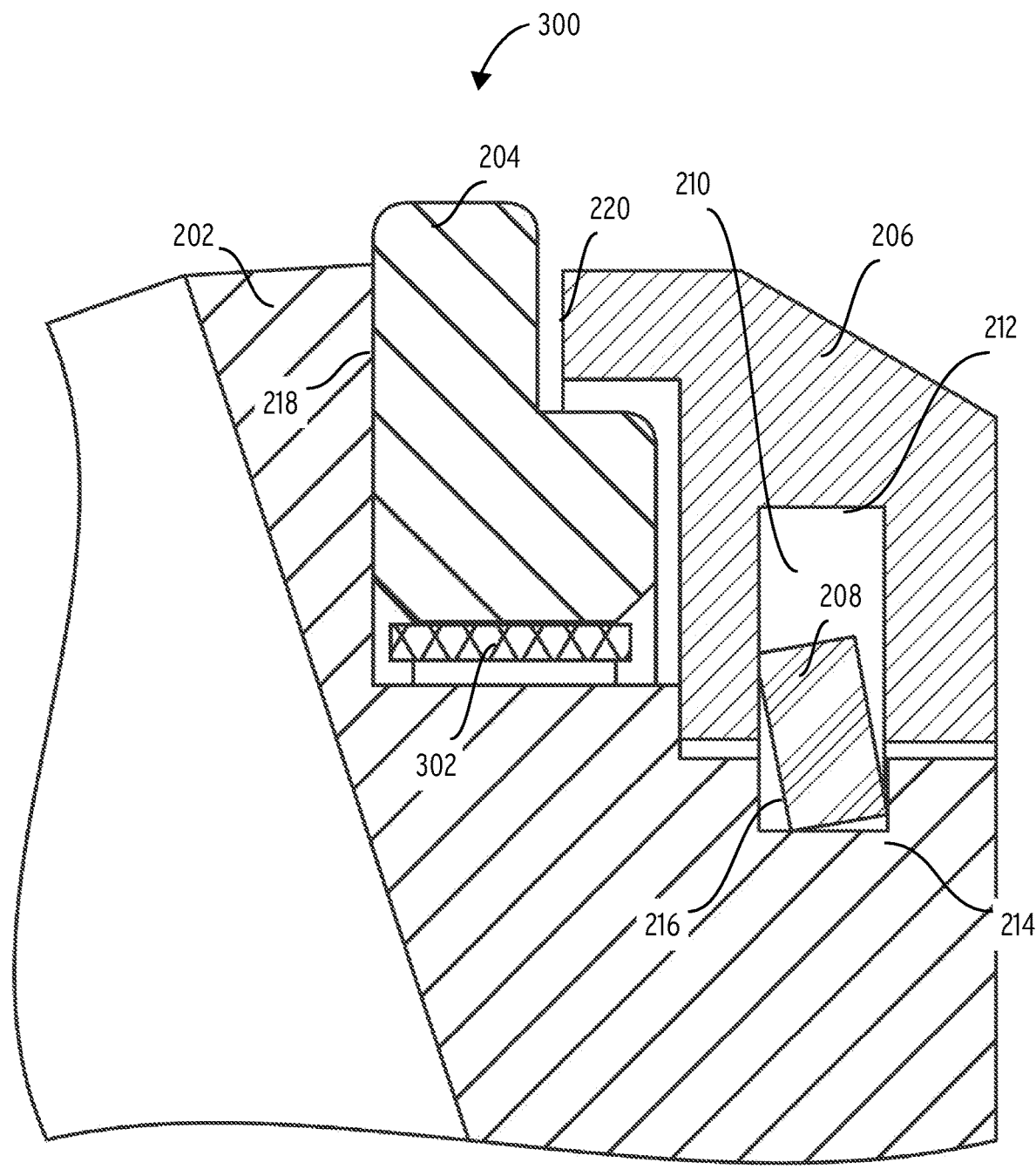
FIG. 3 illustrates an example cross-sectional view in accordance with various aspects described herein.

FIG. 3 illustrates a cross-sectional view of a valve assembly 300 in accordance with various aspects described herein. The valve assembly 300 includes a support 302 disposed at a bottom end of the seal 204. In some embodiments, the support 302 can be a metal support. In other embodiments, the support 302 can be made of steel.

The support 302 confers several advantages to the valve assembly 300. For example, the support 302 acts as a substrate for the seal 204, thus providing increased physical support when the valve assembly 300 is operated. In addition, the support 302 biases the seal 204 against the valve body wall (not shown). This additional biasing reduces leakage when the valve assembly is operated.

Figure 4:
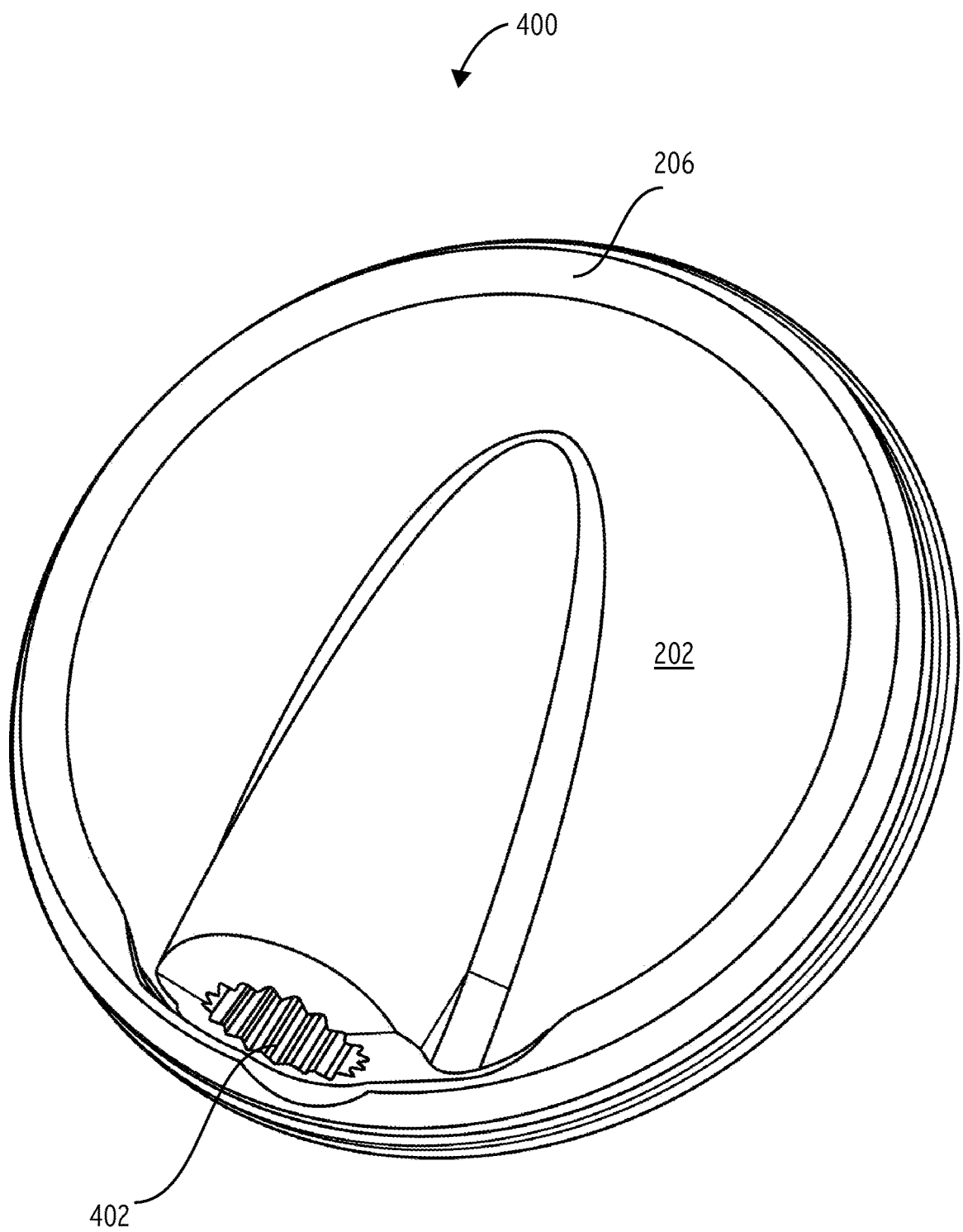
FIG. 4 illustrates an example top view of a valve assembly in accordance with various aspects described herein.

FIG. 4 illustrates an example of a top view 400 of the valve assembly 200 (or of the valve assembly 300). The retainer 206 is disposed at the circumference of the disk member 202. The seal 204 (not shown) can be secured between the disk member 202 and the retainer 206. The force securing the seal 204 therebetween is provided by the retaining ring 208. The valve assembly 200 can also include a port 402 structurally configured to receive a portion of an actuator (not shown). The actuator can be used to switch the valve in open and closed positions, or in any intermediate positions.

In aerospace applications, the valve assembly 200 can be a butterfly valve. More precisely, the valve assembly 200 can be a pressure-regulating butterfly valve assembly. Such a valve could be the lead pressure regulating valve in a jet engine. As such, the valve assembly 200 can provide a robust pressure regulating system in which the carbon seal used (i.e., the seal 204) has an increased lifespan because stresses resulting from the air stream it is subjected to are reduced. These reduced stresses result from the seal 204 being tightly secured between disk member 202 and retainer 206.

Figure 5:
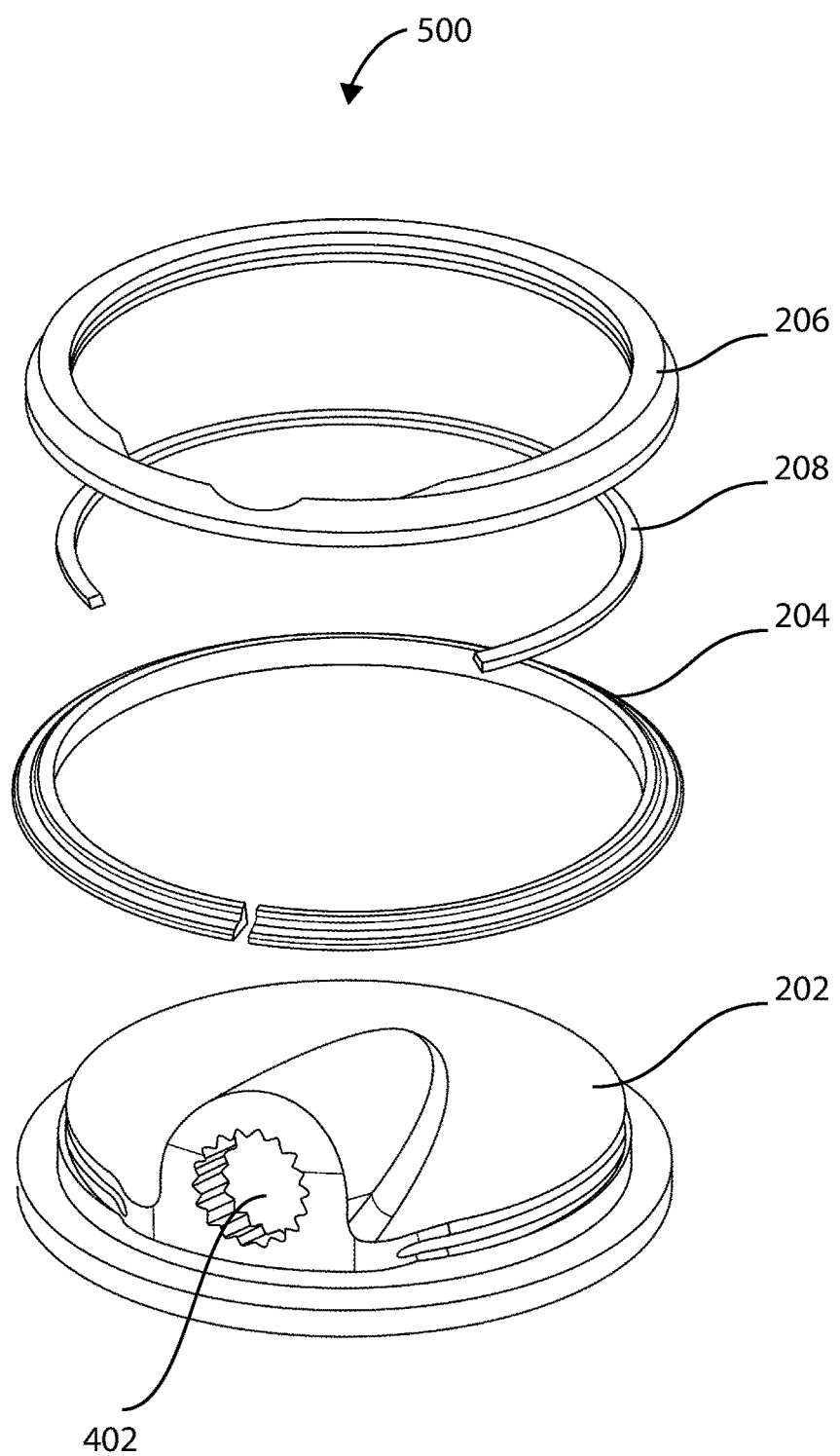
FIG. 5 illustrates an exploded view of the exemplary valve assembly in accordance with various aspects described herein.

FIG. 5 illustrates an example exploded view 500 of the valve assembly 200. Specifically, FIG. 5 shows a more detailed view of the retaining ring 208. While the retaining ring 208 has a rectangular cross-section, it is sloped inwardly. This configuration provides the slant 216 (as shown in FIG. 2) when all the components are assembled to make the valve assembly 200.

Figure 6:
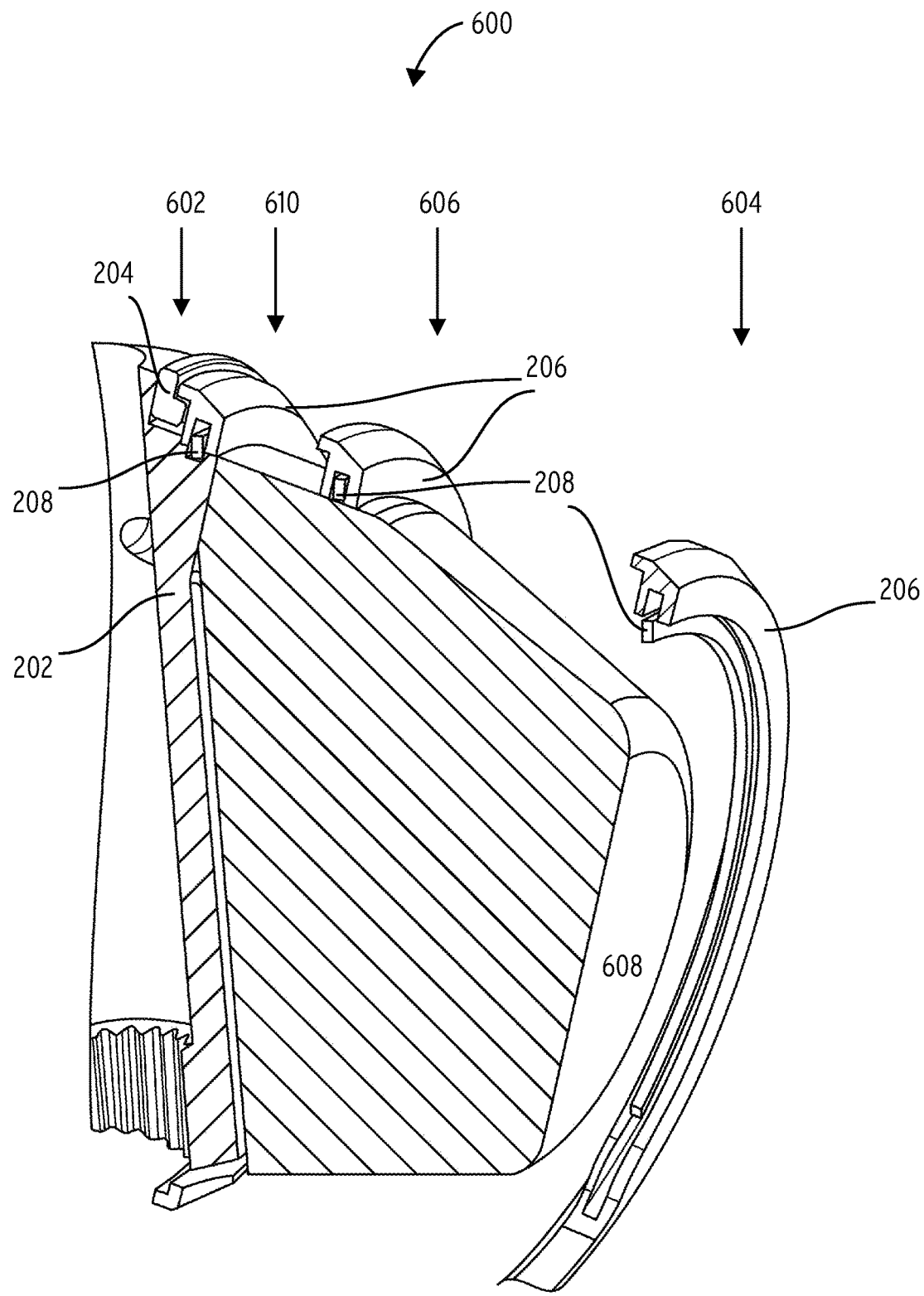
FIG. 6 illustrates an example sequence of steps undertaken when assembling an exemplary valve in accordance with various aspects described herein.
Figure 7:
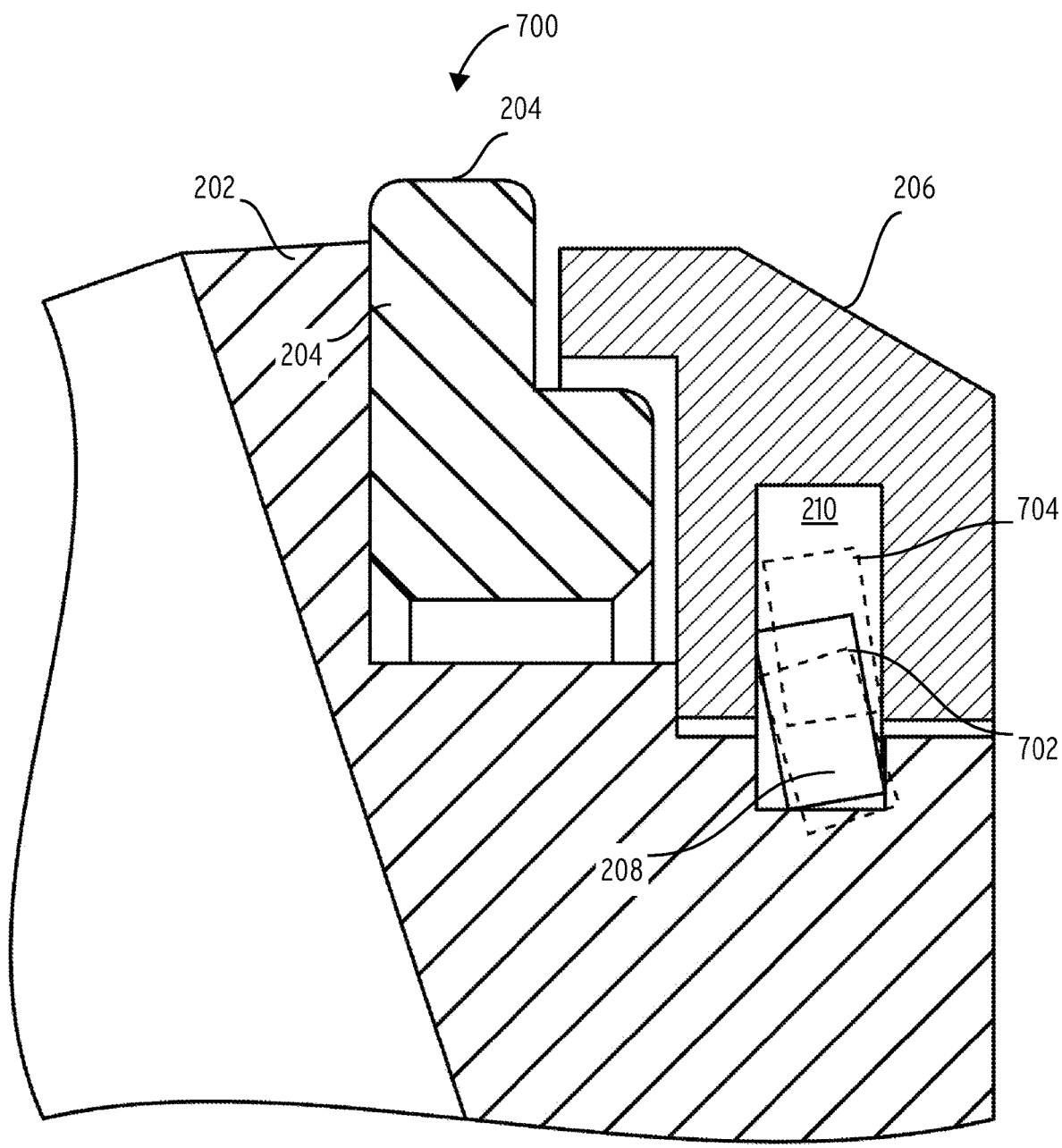
FIG. 7 illustrates various positions of a retaining ring during assembly of an exemplary valve in accordance with various aspects described herein.

Having set forth various embodiments and their structure, specific details regarding the assembly of various constitutive elements of valve assembly 200 are now described with respect to FIG. 6 and FIG. 7.

FIG. 6 illustrates a method 600 for assembling the retaining ring 208 onto a butterfly seal 608. The method 500 includes a step 602 in which the seal 204 is installed on the disk member 202, i.e. on the butterfly portion of the valve. The method 500 further includes a step 604 for inserting the retaining ring 208 in the retainer 206. The step 606 includes sliding the retainer 206, including the retaining ring 208, towards the seal 204. The step 610 includes securing the retainer 206 on the retaining ring 208. The step 610 is passively performed when the two parts come together, as a result of the force generated by the retaining ring 208. Furthermore, in some embodiments, a weld can be made at the interface between the disk member 202 and the retainer 206 to further strengthen the assembly.

FIG. 7 illustrates various possible positions 700 of the retaining ring 208 during the assembly of the valve assembly 200 and in accordance with various aspects described herein. As mentioned above with respect to FIG. 6, the seal 204 is desirably installed on the butterfly portion first, and the subsequent steps of the assembly are then carried out. During the assembly, the position 702 indicates the position of the retaining ring 208 in its free state. More precisely, in its free state, the retaining ring 208 is in the position it would assume if it were placed in the groove of the disk member 202.

Upon assembly, the retaining ring 208 will expand into the groove of the retainer 206, indicated by the position 704. During expansion, the retaining ring 208 will develop an axial pre-load resulting from being compressed axially as it expands radially.

With the retaining ring 208 still expanded inside the retainer 206, the two are slipped over the butterfly (i.e. over the disk member 202). Once the retainer 206 and the retaining ring 208 are mated with the disk member 202, as shown in FIG. 7, the retaining ring 208 pulls inwardly and radially, thus securing the parts together.

Generally, the embodiments provide a retention method for a seal in a valve assembly. The seal is retained in the valve using a retainer. The retainer includes a retaining ring that expands therein and retracts radially when placed in a proper position. A weld can be provided at interface between the retainer and the disk member of the valve, thereby providing a strong retention force and an adequate supporting substrate for the seal. This configuration extends the lifetime of the seal by reducing the amount of stresses exerted on the seal during valve operation.

While the embodiments have been described in the context of valves, butterfly valves, and valve assemblies, one of ordinary skill in the art will readily recognize that the techniques and configurations disclosed herein can be used in applications where any part is to be secured. For example, the techniques disclosed herein can be used to secure a bearing by using a retainer fitted with the retaining ring, as disclosed above.

Moreover, the embodiments provide a method for creating tamper-proof assemblies. Specifically, because once the seal (or a bearing) is secured, the seal cannot be remove be removed from the assembly without releasing the retaining ring, which can only happen by breaking open the cavity in which the retaining ring is located. As such, for some applications, the embodiments provides advantages where means for providing passive tamper-proof mechanisms for securing parts and components are needed.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A valve assembly, comprising:
   a disk member;
   a retainer a seal having two parts, one part being secured between an outer surface of the disk member and a bottom surface of the retainer, and a second part protruding outwardly, away from the disk member and the retainer; and
   a retaining ring having a sloped configuration and being disposed within a cavity formed by adjoining an outer groove of the disk member and an inner groove of the retainer;
   wherein, the sloped configuration of the retaining ring results in the retaining ring having a slanted orientation with respect to an inner surface of the cavity; and
   wherein, the slanted orientation is characterized by (i) an upper portion of the retaining ring being secured against a side of the inner groove of the retainer, and (ii) a lower portion of the retaining ring being secured against an opposite side of the outer groove of the disk member, both (i) and (ii) providing a lateral force that presses the retainer against the seal.

2. The valve assembly of claim 1, wherein the retaining ring has a rectangular cross-section.

3. The valve assembly of claim 1, further comprising a metal support disposed at a bottom end of the seal.

4. The valve assembly of claim 1, wherein the seal includes carbon.

5. The valve assembly of claim 1, wherein at least one of the retainer and the disk member is made of steel.

6. The valve assembly of claim 5, wherein at least one of the retainer and the disk member is made of a corrosion-resistant material.

7. The valve assembly of claim 1, wherein the retaining ring is made of an iron-based alloy.

8. The valve assembly of claim 1, wherein the retaining ring is made of an age hardened iron superalloy.

\* \* \* \* \*